UNITED STATES PATENT OFFICE.

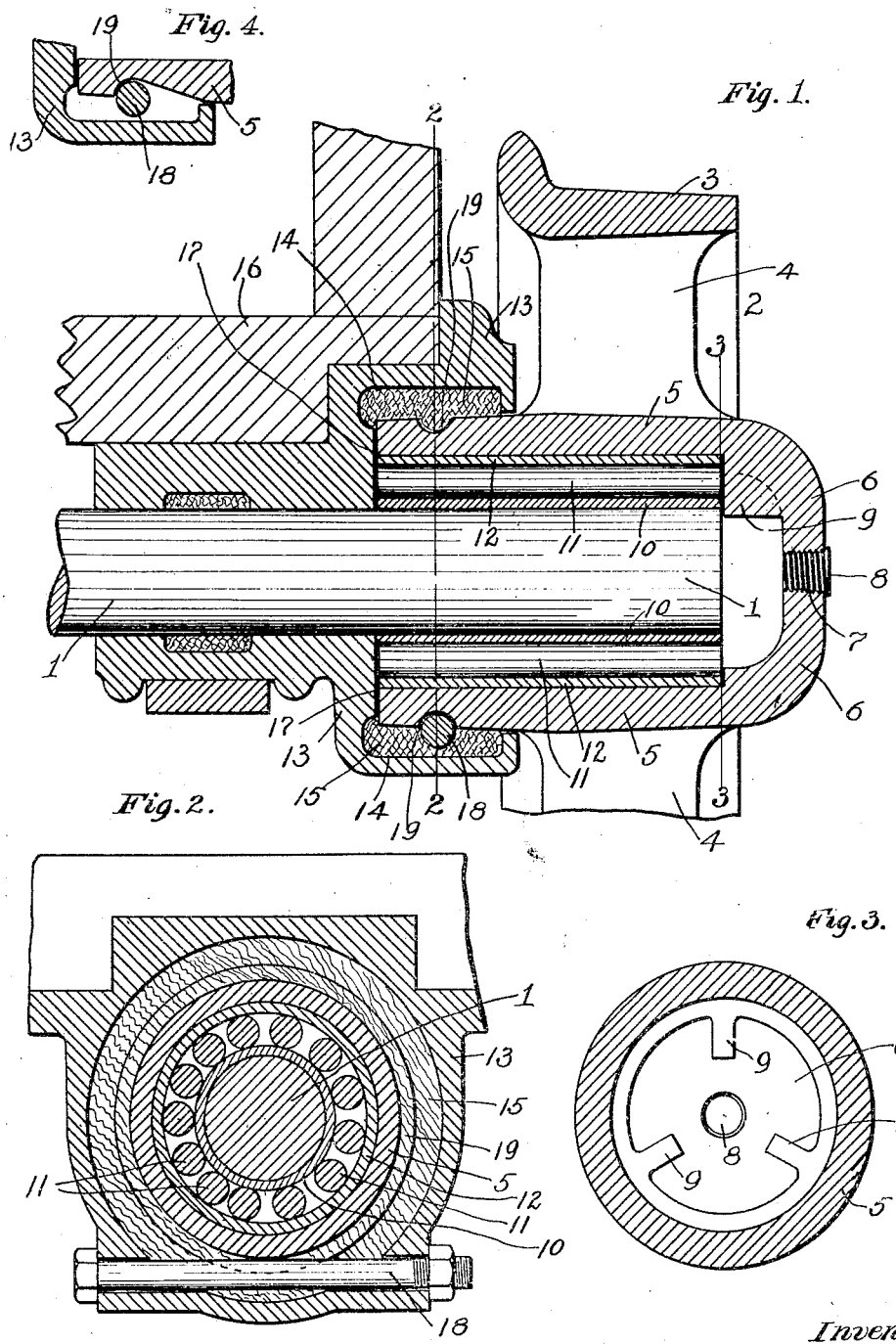

ALFRED B. DAY, OF KNOXVILLE, TENNESSEE.

WHEEL.

No. 907,750.

Specification of Letters Patent.

Patented Dec. 29, 1908.

Application filed July 3, 1908. Serial No. 441,738.

*To all whom it may concern:*

Be it known that I, ALFRED B. DAY, a citizen of the United States, residing at Knoxville, in the county of Knox and State of Tennessee, have invented a new and useful Improvement in Wheels, of which the following is a specification, reference being had to the accompanying drawing.

My improvement relates generally to wheels, pulleys, etc., arranged to rotate upon one end of a shaft or axle.

The improvement is specially applicable to mine cars and similar cars in which the axles are secured to the car body while the wheels are secured rotatably around the ends of the axles.

The object of the invention is (1) to provide an efficient means of holding the wheel on the axle without drilling or grooving the latter and at the same time providing for the ready removal of the wheel from the axle without removing the pedestal or bearing box, (2) to provide for such removal of the wheel while the wheel is a single casting without loose caps and other parts, (3) to provide a wheel that can be adapted to roller bearings and other anti-friction construction and which will allow a continuous bearing surface on the axle from the end of the latter to the pedestal, and (4) to provide a construction requiring a minimum amount of machine work and which is at the same time practically dust and oil tight, to the end that oil or similar lubricant may be constantly kept within the hub and dust, cinders, etc., excluded therefrom.

In the accompanying drawings, Figure 1 is a horizontal upright section of a car structure embodying my improvement; Fig. 2 is a section on the line 2—2 of Fig. 1, looking toward the right; Fig. 3 is a section on the line 3—3 of Fig. 1, looking toward the right; Fig. 4 is a detail section of a portion of the hub and bearing box.

For convenience in description, the side or portion of the wheel directed away from the car will be herein designated the "front" side or portion, while the opposite side or portion will be termed the "rear" side or portion.

In the particular form of the structure shown by the drawings, 1 is one end of a car axle which is secured to a car. The bearing surface of this axle is of plain cylindrical form and the entire axle is preferably of such form, for then no machine-work of any kind is required thereon other than cutting the end smoothly in a plane to which its axis is perpendicular.

The wheel, 2, has a rim, 3; spokes, 4, and a hub, 5. The body of the hub is cylindrical and it has an interior cylindrical chamber extending from the rear end to the front end of the hub, the rear end being open to the same diameter as the interior chamber. Across the front end of said chamber extends an end wall, 6, which is cast integral with the remainder of the hub. Through the center of said end wall extends an aperture, 7, into which is fitted a screw plug, 8. Said aperture is designed for the introduction of lubricant. On the inner face of said wall are three shoulders or abutments, 9, equi-distant from each other and bearing against the end of the shaft, 1.

A sleeve, 10, surrounds the shaft, 1, from the end of the latter to the plane of the end of the hub, said sleeve preferably fitting said axle loosely enough to turn and permit easy removal. Around said sleeve is a series of anti-friction rollers, 11, as long as the sleeve. Surrounding said rollers is another sleeve, 12, which is of the same length as said rollers and the sleeve, 10. Said sleeves and said rollers bear by their front ends against the abutments, 9. At its rear, said hub is extended a suitable distance to enter a bearing box, 13, having an annular packing groove, 14, in which is packing, 15, for preventing the passage of oil, dust, or water. The box, 13, is secured to the car body, 16, in any desired manner. Said box has an inner flat face, 17, which forms an abutment for the rear end of the hub and the rear ends of the sleeves, 10 and 12, and the anti-friction rollers, 11. It has already been pointed out that the front ends of the axle and said sleeves and rollers bear against the abutments, 9, in the front end of the hub. To maintain this position of these parts, a key is seated in the bearing box, 13, and made to engage the hub within said box. The drawings show said key in the form of a bolt, 18, extending transversely through the lower portion of said box approximately tangentially to a circumferential groove, 19, in the outer face of the hub, so that a portion of said bolt will rest in said groove.

As will be readily understood from an inspection of the drawings, the hub is free to turn, the grooved portion thereof slipping on said bolt, but said bolt prevents the hub from slipping endwise. It is to be observed that the essential part of said groove is the rear face thereof; for it is necessary only that the key hold the hub from moving forward (toward the right), and for this it is sufficient if there is an annular shoulder such as is presented by the rear wall or face of said groove. In Fig. 4, the slope of the forward portion of the groove is such as to leave practically only the one shoulder.

It will be observed that the wheel can be removed from the axle by simply removing the key bolt, 18, and pulling the wheel out.

The only machine work needed by the wheel is the finishing of the hub chamber and the threading of the aperture, 7. This calls for only easy and simple lathe work.

The bearing box and the key together constitute mechanism abutting against the inner end of the roller bearing mechanism and the hub and engaging the hub against movement on the axle away from the bearing box.

I claim as my invention:

1. In a structure of the nature described, an axle, a bearing box, a wheel having a hub surrounding said axle and extending into said box and having an annular, circumferential shoulder, and a key combined with said box and tangentially engaging said hub at said shoulder.

2. In a structure of the nature described, an axle, a bearing box, a wheel having a hub surrounding said axle and extending into said box and having an oil inlet and an annular, circumferential shoulder, and a key combined with said box and tangentially engaging said hub at said shoulder.

3. In a structure of the nature described, a cylindrical axle, a bearing box, a wheel having a hub surrounding and abutting against the end of said axle and extending into said box and having an annular, circumferential shoulder, and a key combined with said box and tangentially engaging said hub at said shoulder.

4. In a structure of the nature described, an axle, a bearing box, a wheel having a hub surrounding said axle and extending into said box and having an annular, circumferential shoulder and having a wall extending over its forward end, and a key combined with said box and tangentially engaging said hub at said shoulder.

5. In a structure of the nature described, an axle, a bearing box, anti-friction mechanism, a wheel having a hub surrounding said axle and said anti-friction mechanism and extending into said box and having an annular, circumferential shoulder, and a key combined with said box and tangentially engaging said hub at said shoulder.

6. In a structure of the nature described, an axle, a bearing box, a bolt extending through said bearing box, and a wheel having a hub surrounding said axle and extending into said box and having an annular, circumferential shoulder engaging said bolt.

7. In a structure of the nature described, an axle, a wheel having a hub surrounding said axle and having a circumferential shoulder upon its inner end, a bearing box surrounding said end of said hub, and a member combined with and movable upon said box and engaging said hub tangentially at said shoulder.

8. In a structure of the nature described, an axle, a wheel having a hub surrounding the end portion of said axle, and a box mechanism entirely surrounding the inner end of said hub and the portion of the axle adjacent said hub, said box mechanism comprising a member tangentially engaging said hub against movement on the axle away from said box.

9. In a structure of the nature described, an axle, a wheel having a hub surrounding said axle and having an annular, circumferential shoulder, a bearing box surrounding said axle and the portion of said hub having said annular shoulder and having a packing chamber along said portion of said hub, and a key engaging said shoulder within said packing chamber.

In testimony whereof I have signed my name, in presence of two witnesses, this 30th day of June, in the year one thousand nine hundred and eight.

ALFRED B. DAY.

Witnesses:
C. A. MORSE,
CYRUS KEHR.